United States Patent
You et al.

(10) Patent No.: US 7,539,884 B2
(45) Date of Patent: May 26, 2009

(54) POWER-GATING INSTRUCTION SCHEDULING FOR POWER LEAKAGE REDUCTION

(75) Inventors: Yi-Ping You, Taichung County (TW); Chung Wen Huang, Chiayi County (TW); Jeng Kuen Lee, Tainan (TW); Chi-Lung Wang, Hsinchu (TW); Kuo Yu Chuang, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 518 days.

(21) Appl. No.: 11/493,765

(22) Filed: Jul. 27, 2006

(65) Prior Publication Data

US 2007/0157044 A1   Jul. 5, 2007

(30) Foreign Application Priority Data

Dec. 29, 2005   (TW) ............................... 94147221 A (51) Int. Cl.
*G06F 1/32* (2006.01)
*G06F 1/00* (2006.01)
*G06F 9/45* (2006.01)

(52) U.S. Cl. ..................... 713/320; 713/300; 713/323; 713/324; 717/155; 717/161

(58) Field of Classification Search ................. 713/320, 713/323, 324; 717/155, 161
See application file for complete search history.

(56) References Cited

U.S. PATENT DOCUMENTS

| | | | |
|---|---|---|---|
| 6,185,677 B1 | 2/2001 | Nijhawan et al. | |
| 6,219,796 B1 * | 4/2001 | Bartley | 713/320 |
| 2002/0166075 A1 | 11/2002 | Agarwal et al. | |
| 2003/0014742 A1 * | 1/2003 | Seth et al. | 717/158 |
| 2003/0167460 A1 * | 9/2003 | Desai et al. | 717/151 |
| 2005/0114850 A1 | 5/2005 | Chheda et al. | |
| 2006/0015855 A1 * | 1/2006 | Kumamoto | 717/136 |

FOREIGN PATENT DOCUMENTS

| TW | 519599 A | 6/2001 |
|---|---|---|
| TW | 576980 B | 2/2004 |
| TW | 514828 B | 12/2008 |

* cited by examiner

*Primary Examiner*—Mark Connolly
*Assistant Examiner*—Stefan Stoynov
(74) *Attorney, Agent, or Firm*—Birch, Stewart, Kolasch & Birch, LLP (57) ABSTRACT

A method of power-gating instruction scheduling for leakage power reduction comprises receiving a program, generating a control-flow graph dividing the program into a plurality of blocks, analyzing utilization of power-gated components of a processor executing the program, generating the first power-gating instruction placement comprising power-off instructions and power-on instructions to shut down the inactive power-gated components, generating the second power-gating instruction placement by merging the power-off instructions as one compound power-off instruction and merging the power-on instructions as one compound power-on instruction, and inserting power-gating instructions into the program in accordance with the second power-gating instruction placement.

12 Claims, 10 Drawing Sheets

POWER-GATING INSTRUCTION SCHEDULING FOR POWER LEAKAGE REDUCTION

BACKGROUND OF THE INVENTION

1. Field of the Invention

The invention relates to a method of reducing power leakage in processors or ICs, and in particular to a method of power-gating instruction scheduling for power leakage reduction.

2. Description of the Related Art

Overall power dissipation in semiconductor application comprises static power dissipation and dynamic power dissipation, generated by current leakage and switching transient current in complementary metal oxides semiconductor (CMOS) circuits, respectively. As semiconductor technology continues to scale down to deep-submicron levels, power leakage gains more significance in the total power dissipation.

In recent years, many power-gating mechanisms have been developed and employed to reduce the static power loss generated by the current leakage in CMOS circuits. The power-gating mechanisms insert power-gating instructions into a program to reduce power leakage of power-gated components in the processor. The power-gating instructions comprise power-off and power-on instructions to shut down inactive power-gated components.

ROC. Pat. Pub. No. 00519599 discloses architecture and complier solutions to employ a power-gating mechanism to reduce the current leakage in power-gated components of a processor executing a program. The power-gating mechanism analyzes utilization of the power-gated components by data-flow analysis on the basis of the program and then inserts power-off and power-on instructions into the program to shut down the inactive power-gated components.

However, the power-off and power-on instructions increase execution time of the program and increase code size. With the development of semiconductor manufacturing technologies, the increasing number of power-gated components in a processor aggravates the above drawbacks. Moreover, fetching and decoding of power-gating instructions, and shut-down and wake-up procedures all results in power loss. Power loss from wake-up is derived from peak-voltage requirements. Therefore, it is advantageous necessary to reduce power-gating instructions.

BRIEF SUMMARY OF THE INVENTION

The invention provides a method of reducing power-gating instructions without increasing power loss. By postponing the power-off instruction to other blocks and advancing the power-on instructions to other blocks, the combined power-gating instructions are merged as one compound power-gating instruction, enabling power reduction and reducing code size. The invention provides a method of power-gating instruction scheduling for power leakage reduction comprising receiving a program, generating a control-flow graph which divides the program into a plurality of blocks, analyzing utilization of power-gated components of a processor executing the program, generating the first power-gating instruction placement comprising power-off instructions and power-on instructions to shut down the inactive power-gated components, generating the second power-gating instruction placement by merging the power-off instructions into one compound power-off instruction and merging the power-on instructions into one compound power-on instruction and inserting power-gating instructions into the program in accordance with the second power-gating instruction placement.

The invention also provides a system of power-gating instruction scheduling for reducing power leakage, receiving a program, generating a power-gated program comprising power-gating instructions, and comprising a control-flow graph construction module, generating a control-flow graph by dividing the program into a plurality of blocks and linking the blocks according to the program, wherein the control-flow graph contains control commands, a utilization analysis module, analyzing utilization of power-gated components of a processor executing the program, a first power-gating instruction placement generator, generating first power-gating instruction placement based on the control-flow graph and the utilization of the power-gated components, the first power-gating instruction placement comprising a plurality of power-off instructions and a plurality of power-on instructions to shut down inactive power-gated components, a second power-gating instruction placement generator, generating second power-gating instruction placement by modifying the first power-gating instruction placement, wherein the second power-gating instruction placement comprises compound power-off instructions and compound power-on instructions generated by combining the power-off instructions and the power-on instructions respectively, and a power-gating instruction insertion module, inserting the power-gating instructions into the program according to the second power-gating instruction placement to generate the power-gated program.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
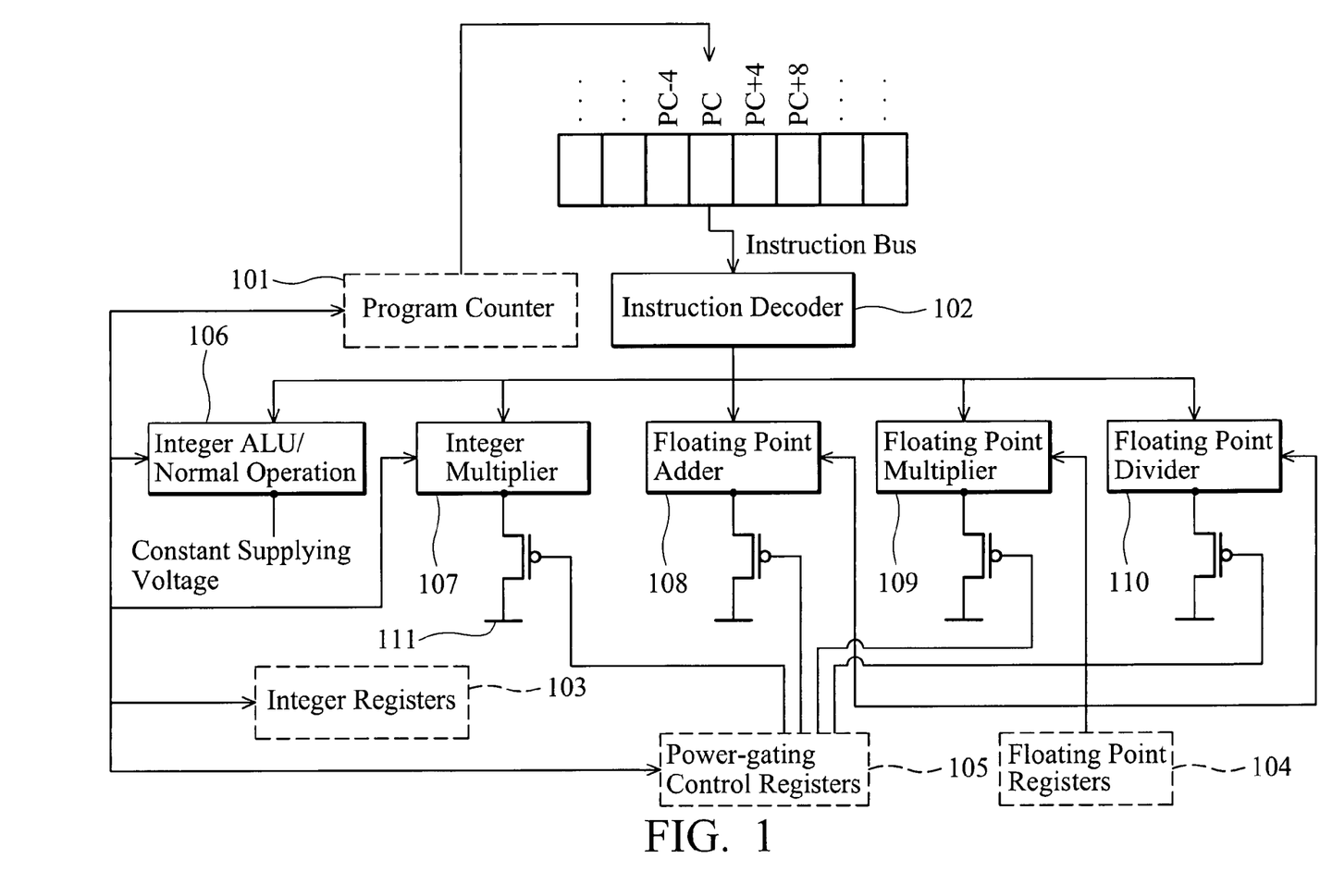
FIG. 1 shows architecture of a processor.

FIG. 1 shows architecture of a processor comprising a program counter 101, a instruction decoder 102, integer registers 103, floating point registers 104, power-gating control registers 105, an integer ALU 106, an integer multiplier 107, a floating point adder 108, a floating point multiplier 109, and a floating point divider 110. The power-gated components of the processor, comprising the integer multiplier 107, the floating point adder 108, the floating point multiplier 109, and the floating point divider 110, are equipped individually with a power-gating control unit 111 controlled by the value stored in the power-gating control registers 105. According to power-off and power-on instructions in a power-gated program, the processor generates the value stored in the power-gating control registers 105.

Figure 2:
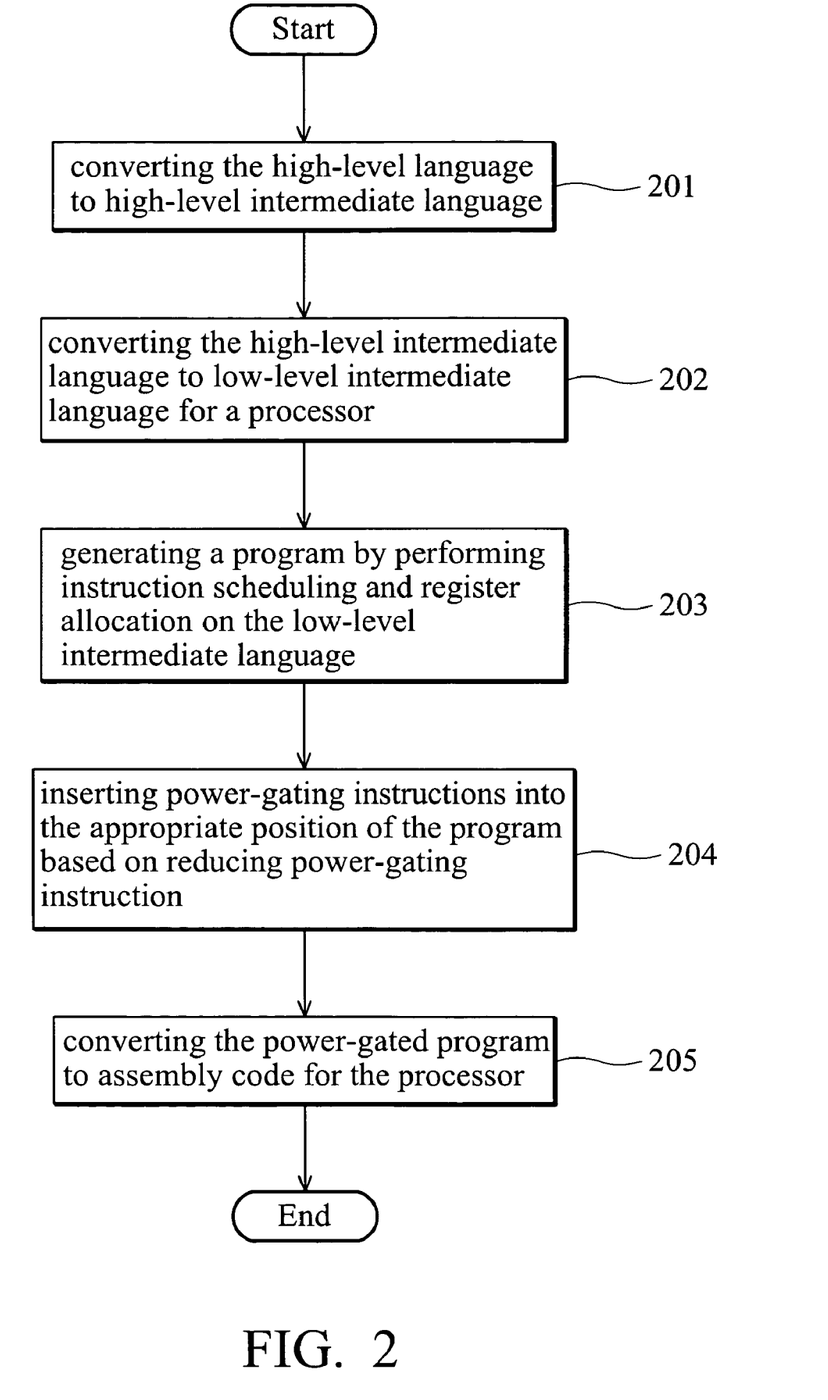
FIG. 2 shows a method of generating assembly code for power leakage reduction.

FIG. 2 shows a method of generating assembly code for power leakage reduction, based on a compiler solution and comprising receiving high-level language, and converting the high-level language to high-level intermediate language (step 201), converting the high-level intermediate language to low-level intermediate language for a processor (step 202), generating a program by performing instruction scheduling and register allocation on the low-level intermediate language (step 203); converting the program to a power-gated program by analyzing utilization of the power-gated components in the processor in accordance with the program and inserting power-gating instructions into the appropriate position of the program to reduce power-gating instructions (step 204); converting the power-gated program to assembly code for the processor (step 205).

Figure 3:
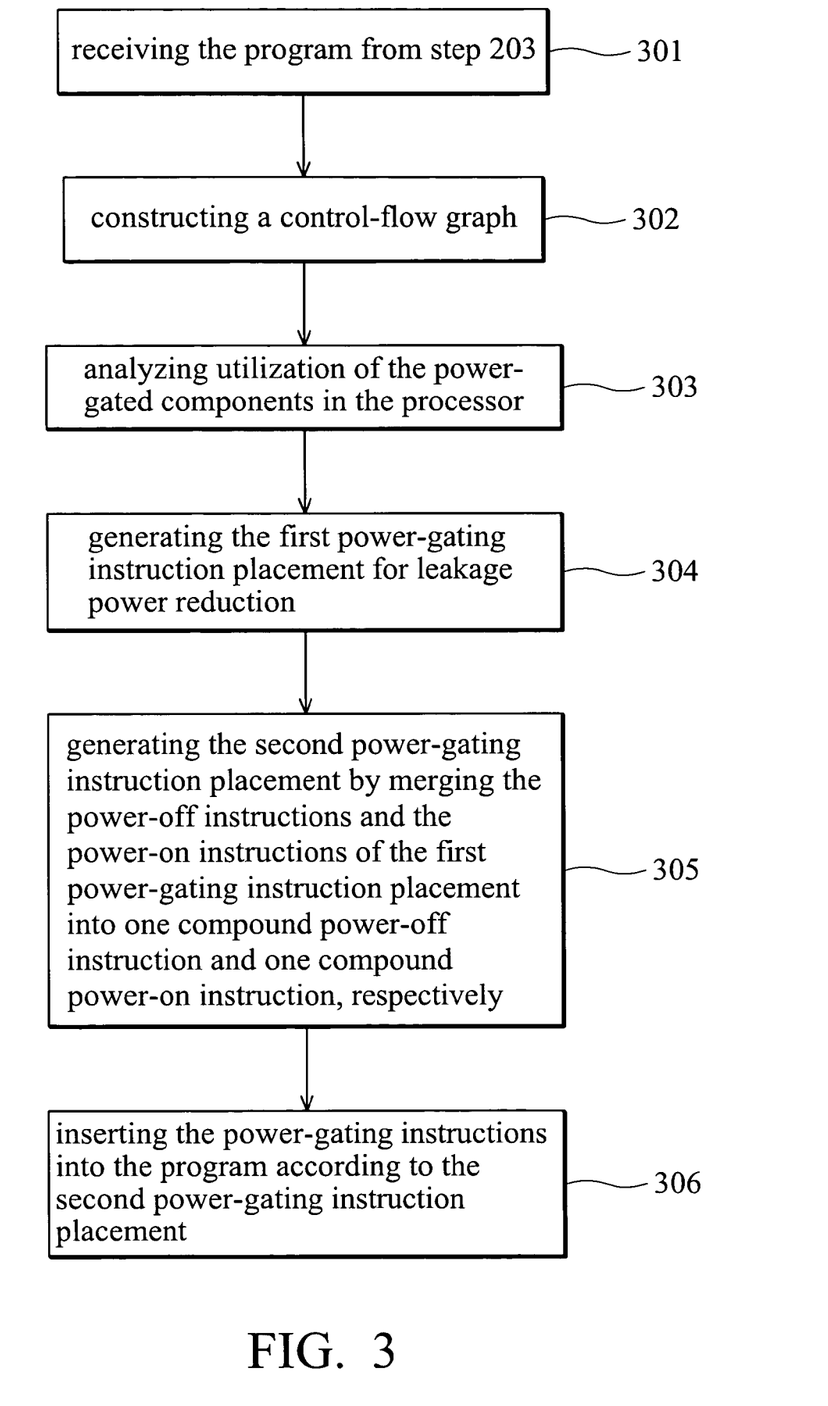
FIG. 3 shows step 204 in detail.

FIG. 3 shows step 204 in detail, comprising receiving the program from step 203 (step 301), generating a control-flow graph by dividing the program into blocks and linking the blocks, the control-flow graph comprising control commands (step 302), analyzing utilization of the power-gated components in the processor (step 303), generating the first power-gating instruction placement for leakage power reduction according to the utilization of the power-gated components, the first power-gating instruction comprising power-off and power-on instructions to shut down the inactive power-gated components (step 304), generating the second power-gating instruction placement by merging the power-off instructions and the power-on instructions of the first power-gating instruction placement into one compound power-off instruction and one compound power-on instruction, respectively (step 305), and inserting the power-gating instructions, including the power-off, power-on, compound power-off, and compound power-on instructions, into the program according to the second power-gating instruction placement (step 306).

Step 302 to 304 can be implemented by the processes disclosed in ROC. Pat. Pub. No. 00519599 or other technologies such as profiling mechanisms which can also be applied to generate the first power-gating instruction placement. Other suitable technologies generating the first power-gating instruction placement by software or hardware solution are also applicable.

Figure 4:
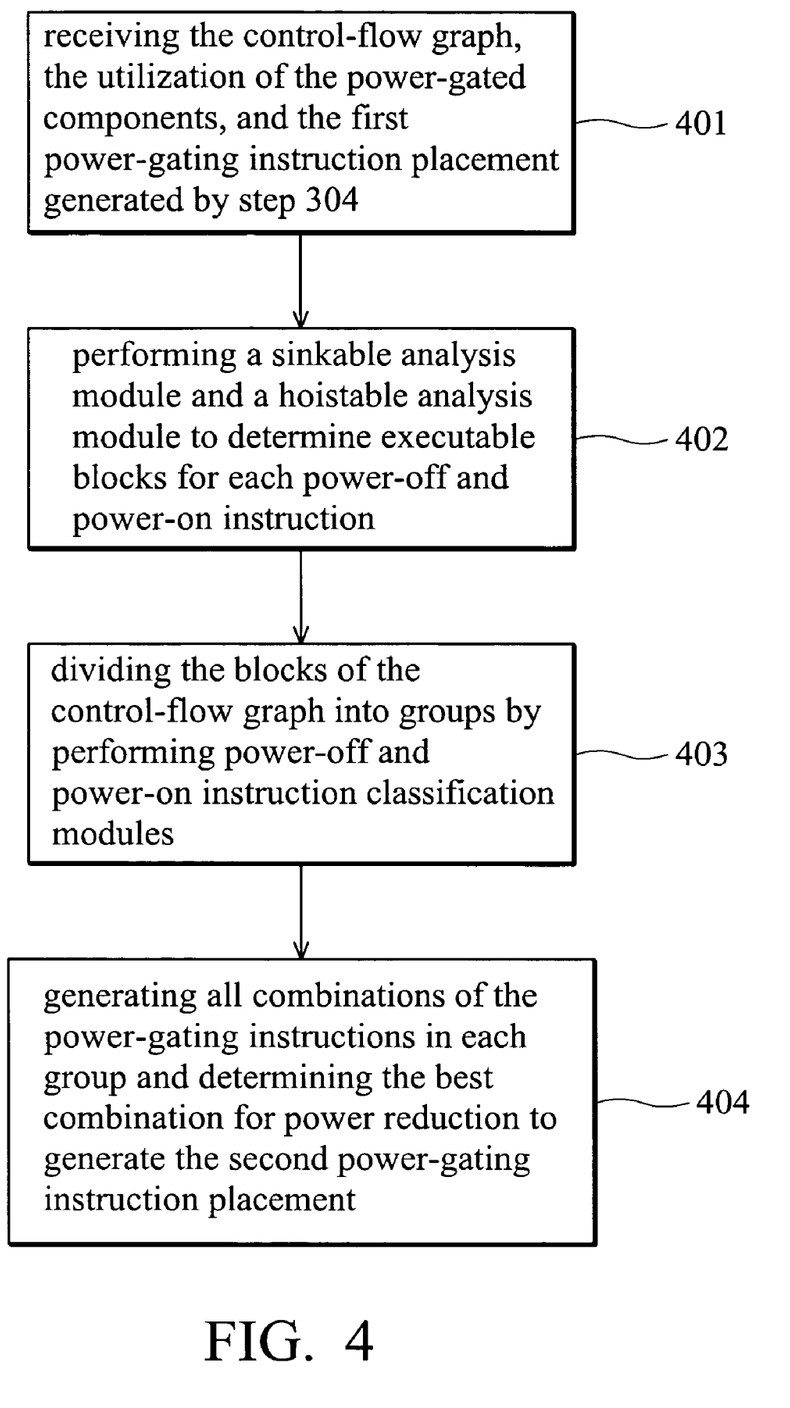
FIG. 4 shows step 305 in detail.

FIG. 4 shows step 305 in detail comprising receiving the control-flow graph of the program, the utilization of the power-gated components in each block of the control-flow graph, and the first power-gating instruction placement generated by step 304 (step 401), determining whether the power-off instructions of the first power-gating instruction placement can be postponed to other blocks to determine executable blocks for each power-off instruction, and determining whether the power-on instructions of the first power-gating instruction placement can be advanced to other blocks to determine executable blocks for each power-on instruction: (step 402), dividing the blocks of the control-flow graph into groups to class the executable blocks of the combinable power-off instructions into one group, and to class the executable blocks of the combinable power-on instructions into one group (step 403), generating all combinations of the power-gating instructions in each group in accordance to the executable blocks of the power-off or power-on instructions occurring in each group and determining the best combination for power reduction to generate the second power-gating instruction placement.

In an exemplary embodiment of the invention, MAX-SINK-SLK$_C$ represents the maximum number of blocks to which the power-off instruction of component C can be postponed. SINK-SLK$_C$ represents the number of blocks to which the power-off instruction of component C can be postponed from the present block. SINK-SLK$_C$ is calculated by the formula $$E_{off}(C)+P_{rleak}(C) \cdot \text{SINK\_SLK}_C > E_{fet\text{-}dec\text{-}off}(C)/N+E_{exe\text{-}off}(C)+P_{leak}(C) \cdot \text{SINK\_SLK}_C, \quad (1).$$

where $E_{fet\text{-}dec\text{-}off}(C)$ represents energy consumption of fetching and decoding the power-off instruction of component C, $E_{exe\text{-}off}(C)$ represents energy consumption of executing the power-off instruction of component C, N represents the amount of power-gated components in the processor, $P_{leak}(C)$ represents leakage energy consumption of component C during a block cycle, $P_{rleak}(C)$ represents reduced leakage energy consumption of component C during a block cycle when the component C is shut down, $E_{off}(C)$ represents energy consumption of issuing the power-off instruction of component C, and the value of $E_{off}(C)$ equals the sum of $E_{exe\text{-}off}(C)$ and $E_{fet\text{-}dec\text{-}off}(C)$. MAX-SINK-SLK$_C$ is calculated according to formula (1), wherein $$\text{MAX} - \text{SINK} - SLK_C = \frac{(N-1) \cdot E_{fet-dec-off}(C)}{N \cdot (P_{leak}(C) - P_{rleak}(C))}. \quad (2)$$

Similarly, MAX-HOIST-SLK$_C$ represents the maximum number of blocks to which the power-on instruction of component C can be advanced. HOIST-SLK$_C$ represents the number of blocks to which the power-on instruction of component C can be advanced from the present block. HOIST-SLK$_C$ is calculated by the formula $$E_{on}(C)+P_{rleak}(C) \cdot \text{HOIST\_SLK}_C > E_{fet\text{-}dec\text{-}on}(C)/N+ E_{exe\text{-}on}(C)+P_{leak}(C) \cdot \text{HOIST\_SLK}_C, \quad (3)$$

where $E_{fet\text{-}dec\text{-}on}(C)$ represents energy consumption of fetching and decoding a power-on instruction of component C, $E_{exe\text{-}on}(C)$ represents energy consumption of executing the power-off instruction of component C, N represents the number of power-gated components in the processor, $E_{on}(C)$ represents energy consumption of issuing the power-on instruction of component C, and the value of $E_{on}(C)$ equals the sum of $E_{exe\text{-}on}(C)$ and $E_{fet\text{-}dec\text{-}on}(C)$. MAX-HOIST-SLK$_C$ is calculated according to formula (3), wherein $$\text{MAX} - \text{Hoist} - SLK_C = \frac{(N-1) \cdot E_{fet-dec-on}(C)}{N \cdot (P_{leak}(C) - P_{rleak}(C))}. \quad (4)$$

Figure 5:
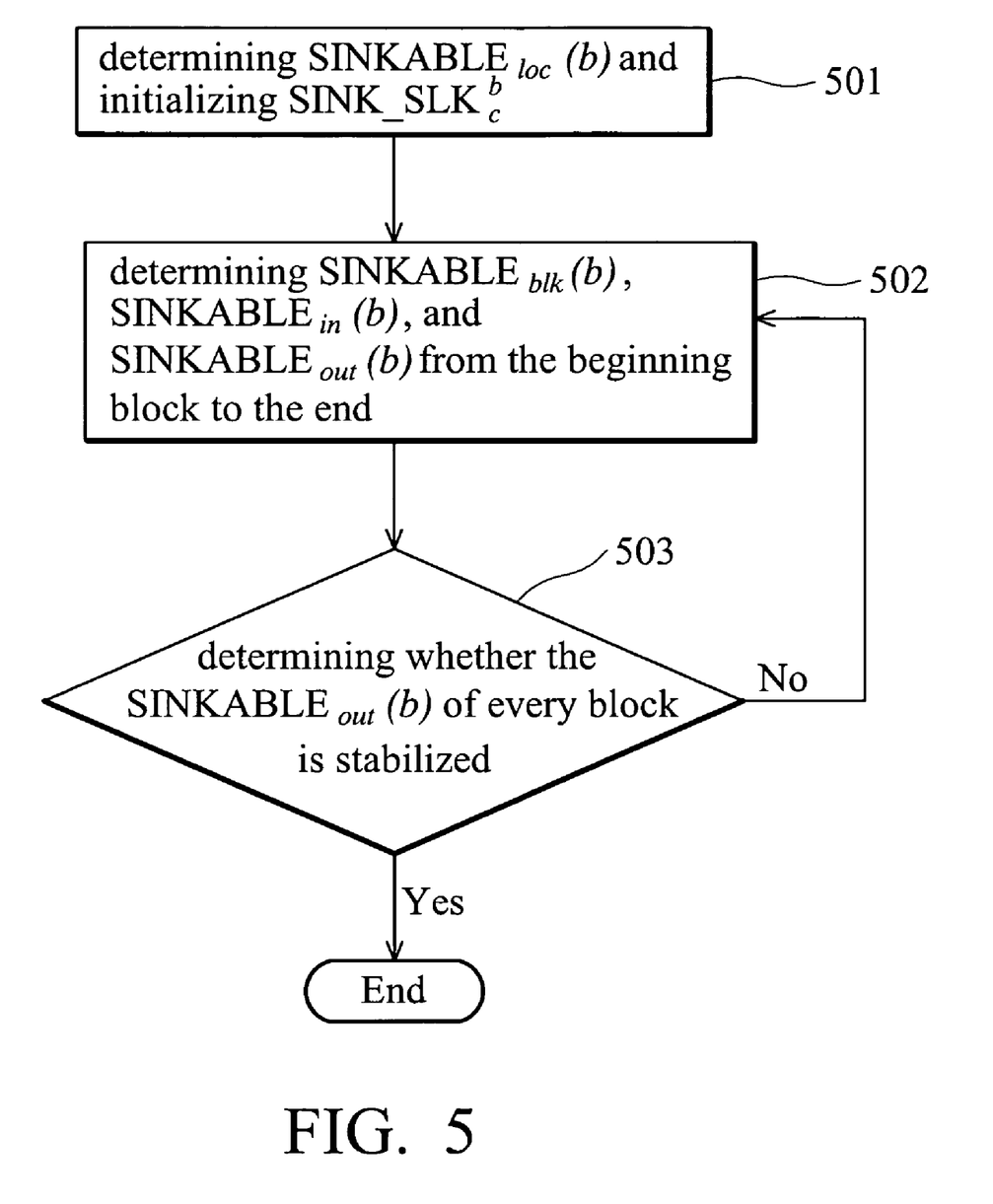
FIG. 5 is a flowchart of a sinkable analysis module.

SINKABLE$_{loc}$(b), SINKABLE$_{blk}$(b), SINKABLE$_{in}$(b), and SINKABLE$_{out}$(b) of each block b are determined to perform a data-flow analysis to determine the executable power-off instructions in each block. SINK-SLK$_C^b$ represents the number of blocks to which the power-off instruction of component C can be postponed from block b. FIG. 5 is a flowchart of the sinkable analysis module. Based on the first power-gating instruction placement, SINKABLE$_{loc}$(b) represents a set of power-off instructions occurring in block b. In step 501, SINKABLE$_{loc}$(b) of each block b is determined and SINK-SLK$_C^b$ of the power-off instructions occurring in each block b are initialized as the corresponding MAX-SINK-SLK$_C$.

In step 502 and step 503, SINKABLE$_{blk}$(b), SINKABLE$_{in}$(b), and SINKABLE$_{out}$(b) of each block b are determined from the beginning block to the end and repeatedly until SINKABLE$_{out}$(b) of each block b is stabilized. The method of determining SINKABLE$_{blk}$(b), SINKABLE$_{in}$(b), and SINKABLE$_{out}$(b) in one block b comprises determining SINKABLE$_{in}$(b) by the formula $$SINKABLE_{in}(b) = \bigcap_{p \in Pred(b)} SINKABLE_{out}(p),$$

where Pred(b) represents the former blocks of the block b. SINK-SLK$_C^b$ of component C, the power-off instruction of which exists in SINKABLE$_{in}$(b) and not in SINKABLE$_{loc}$(b), is determined by the formula SINK-SLK$_C^b$ = MIN$_{p \in Pred(b)}$(SINK-SLK$_C^p$)−1. The components in SINKABLE$_{blk}$(b) are power-off instructions having zero SINK-SLK$_C^b$. Finally, SINKABLE$_{out}$(b) is determined by the formula $$SINKABLE_{out}(b) = SINKABLE_{loc}(b) \cup (SINKABLE_{in}(b) - SINKABLE_{blk}(b)).$$

If the components in SINKABLE$_{out}$(b) of each block b are invariable (step 503), SINKABLE$_{out}$(b) of every block b is regarded as stable and the power-off instructions in SINKABLE$_{out}$(b) are the executable power-off instructions of each block b.

Figure 6:
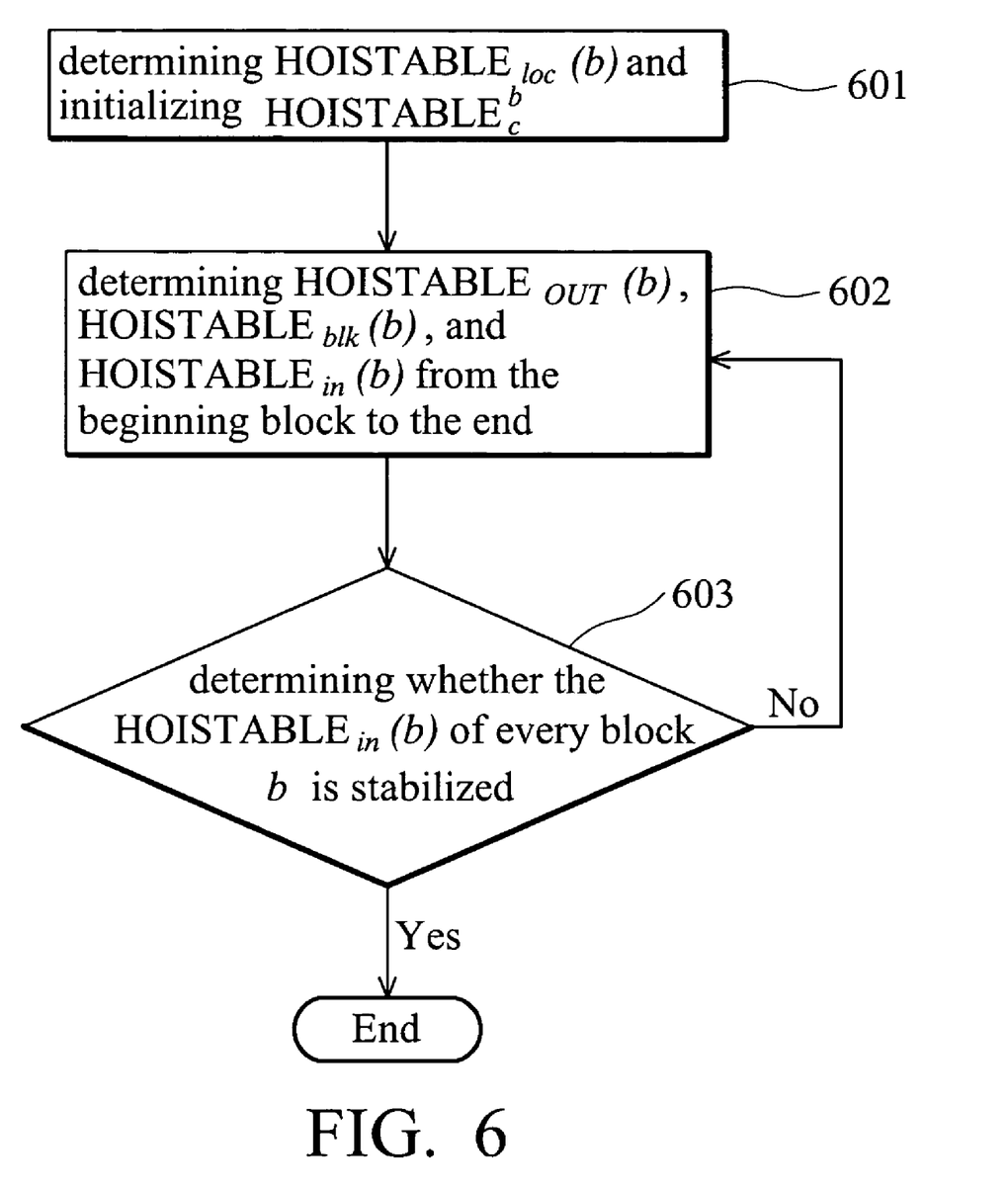
FIG. 6 is a flowchart of a hoistable analysis module.

Similarly, HOISTABLE$_{loc}$(b), HOISTABLE$_{in}$(b), HOISTABLE$_{blk}$(b), and HOISTABLE$_{out}$(b) of each block b are determined to perform a data-flow analysis to determine the executable power-on instructions in each block. HOIST-SLK$_C^b$ represents the number of blocks to which the power-on instruction of component C can be advanced from block b. FIG. 6 is a flowchart of the hoistable analysis module. Based on the first power-gating instruction placement, HOISTABLE$_{loc}$(b) represents a set of power-on instructions occurring in block b. In step 601, HOISTABLE$_{loc}$(b) of each block b is determined and HOIST-SLK$_C^b$ of the power-on instructions occurring in each block b are initialized as the corresponding MAX-HOIST-SLK$_C$.

In step 602 and step 603, HOISTABLE$_{in}$(b), HOISTABLE$_{blk}$(b), and HOISTABLE$_{out}$(b) of each block b are determined from the beginning block to the end and repeatedly until HOISTABLE$_{in}$(b) of each block b is stable. Determining HOISTABLE$_{in}$(b), HOISTABLE$_{blk}$(b), and HOISTABLE$_{out}$(b) in one block b comprising determining HOISTABLE$_{out}$(b) by the formula $$HOISTABLE_{out}(b) = \bigcap_{s \in Succ(b)} HOISTABLE_{in}(s),$$

where Succ(b) represents the subsequent blocks of the block b. HOIST-SLK$_C^b$ of component C, the power-on instruction of which exists in HOISTABLE$_{out}$(b) and not in HOISTABLE$_{loc}$(b), is determined by the formula HOIST-SLK$_C^b$ = MIN$_{s \in Succ(b)}$(HOIST-SLK$_C^s$)−1. The components in HOISTABLE$_{blk}$(b) are the power-on instructions having zero HOIST-SLK$_C^b$. HOISTABLE$_{in}$(b) is determined by the formula $$HOISTABLE_{in}(b) = HOISTABLE_{loc}(b) \cup (HOISTABLE_{out}(b) - HOISTABLE_{blk}(b)).$$

If the components in HOISTABLE$_{in}$(b) of each block b are invariable (step 603), HOISTABLE$_{in}$(b) of every block b is regarded as stable and the power-on instructions in HOISTABLE$_{in}$(b) are the executable power-on instructions of each block b.

Figure 7:
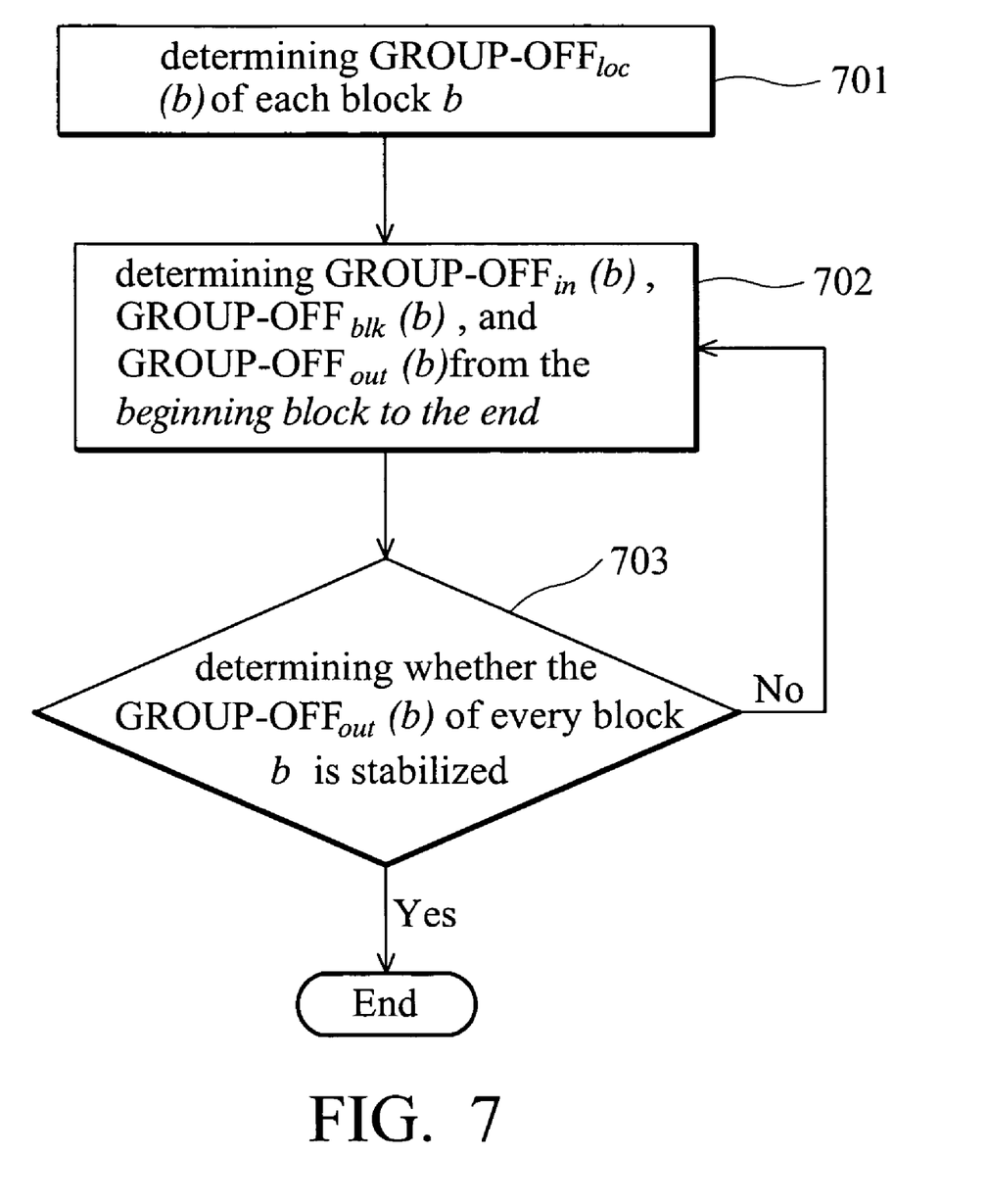
FIG. 7 is a flowchart of a power-off instruction classification module.

GROUP-OFF$_{loc}$(b), GROUP-OFF$_{in}$(b), GROUP-OFF$_{blk}$(b), and GROUP-OFF$_{out}$(b) of each block b are determined to perform a data-flow analysis to class the executable blocks of the combinable power-off instructions into one group. FIG. 7 is a flowchart of the power-off instruction classification module.

In step 701, if $$SINKABLE_{out}(b) \neq \phi \text{ and } \bigcup_{p \in Pred(b)} SINKABLE_{out}(p) = \phi,$$

GROUP-OFF$_{loc}$(b) of block b is assigned an integer number not occurring before to generate a new group. The integer number is generated by a counter. Once a new group is determined, the output of the counter is increased by one.

In step 702 and step 703, GROUP-OFF$_{in}$(b), GROUP-OFF$_{blk}$(b), and GROUP-OFF$_{out}$(b) of each block b are determined from the beginning block to the end and repeatedly until GROUP-OFF$_{out}$(b) of every block b is stable. Determining GROUP-OFF$_{in}$(b), GROUP-OFF$_{blk}$(b), and GROUP-OFF$_{out}$(b) in one block b comprising determining GROUP-OFF$_{in}$(b) by the formula $$GROUP\text{-}OFF_{in}(b) = \begin{cases} \phi, & \text{if } MIN_{p \in Pred(b)} (\Phi(GROUP\text{-}OFF_{out}(p))) = \infty \\ MIN_{p \in Pred(b)} (\Phi(GROUP\text{-}OFF_{out}(p))), & \text{otherwise} \end{cases},$$

where $\Phi$ returns infinity if its parameter, GROUP-OFF$_{out}$(p), is an empty set, otherwise, $\Phi$ returns the value of GROUP-OFF$_{out}$(p). GROUP-OFF$_{blk}$(b), either a universal set named $\Omega$ or an empty set, is determined, wherein GROUP-OFF$_{blk}$(b) is a universal set $\Omega$ only when $$SINKABLE_{out}(b) = \emptyset \text{ and } \bigcup_{p \in Pred(b)} SINKABLE_{out}(p) \neq \phi.$$

GROUP-OFF$_{out}$(b) is determined by the formula $$GROUP\text{-}OFF_{out}(b) = GROUP\text{-}OFF_{loc}(b) \cup (GROUP\text{-}OFF_{in}(b) - GROUP\text{-}OFF_{blk}(b)).$$

If the components in GROUP-OFF$_{out}$(b) of each block b are invariable (step 703), GROUP-OFF$_{out}$(b) of every block b is regarded as stable, with the component in GROUP-OFF$_{out}$(b) representing the group number to which block b belongs.

Figure 8:
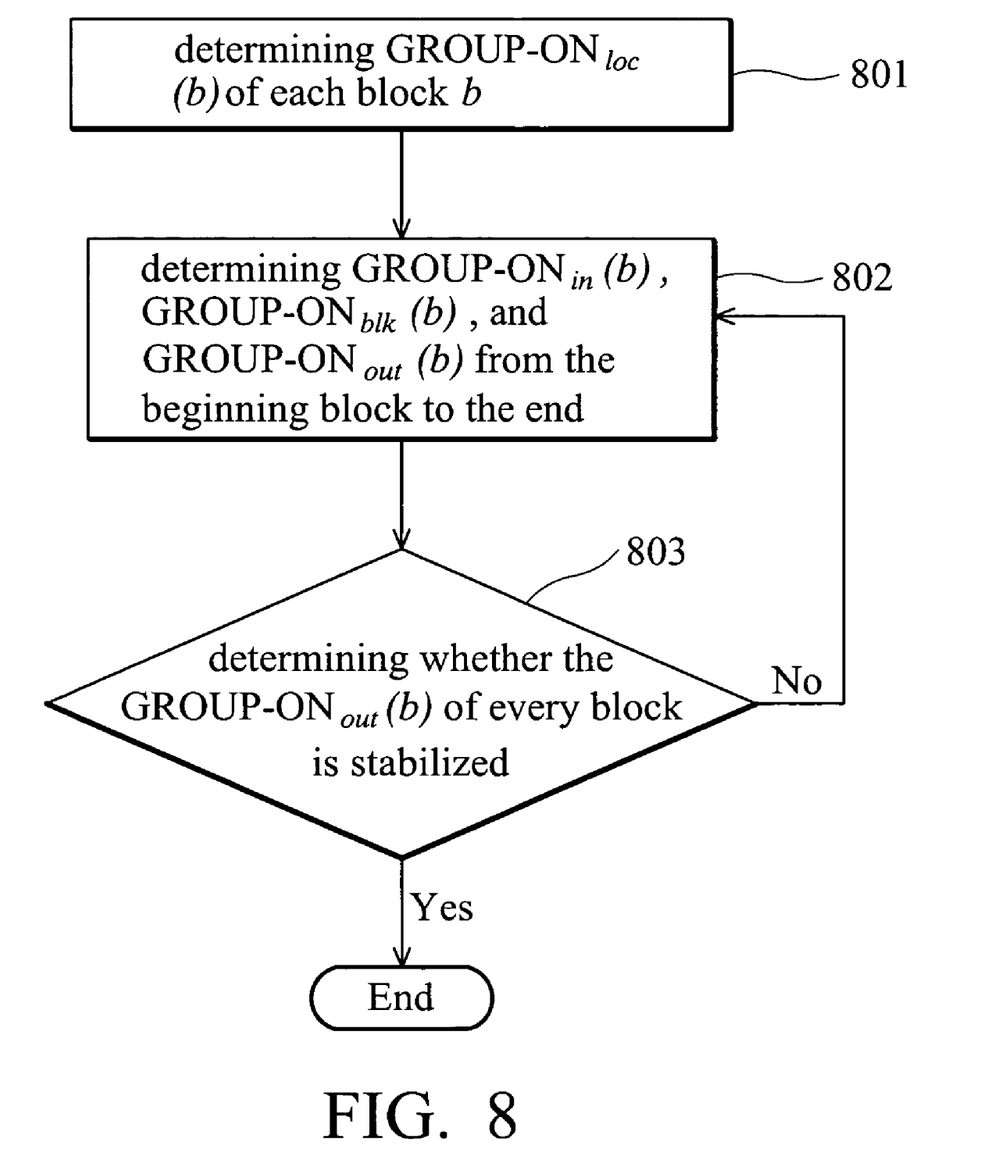
FIG. 8 is a flowchart of a power-on instruction classification module.

GROUP-ON$_{loc}$(b), GROUP-ON$_{in}$(b), GROUP-ON$_{blk}$(b), and GROUP-ON$_{out}$(b) of each block b are determined to perform a data-flow analysis to class the executable blocks of the combinable power-on instructions into one group. FIG. 8 is a flowchart of the power-on instruction classification module.

In step 801, if $$HOISTABLE_{in}(b) \neq \emptyset \text{ and } \bigcup_{p \in Pred(b)} HOISTABLE_{in}(p) = \emptyset,$$

GROUP-ON$_{loc}$(b) of block b is assigned an integer number not occurring before to generate a new group. The integer number is generated by a counter. Once a new group is determined, the output of the counter is increased by one.

In step 802 and step 803, GROUP-ON$_{in}$(b), GROUP-ON$_{blk}$(b), and GROUP-ON$_{out}$(b) of each block b are determined from the beginning block to the end and repeatedly until GROUP-ON$_{out}$(b) of every block b is stable. Determining GROUP-ON$_{in}$(b), GROUP-ON$_{blk}$(b), and GROUP-ON$_{out}$(b) in one block b comprising determining GROUP-ON$_{in}$(b) by the formula $$\text{GROUP-}ON_{in}(b) \begin{cases} \phi, & \text{if } MIN_{p \in Pred(b)} \\ & (\Phi(\text{GROUP-}ON_{out}(p))) = \infty \\ MIN_{p \in Pred(b)} & \\ (\Phi(\text{GROUP-}ON_{out}(p))), & \text{otherwise} \end{cases}$$

GROUP-ON$_{blk}$(b), either a universal set named Ω or an empty set, is determined. GROUP-ON$_{blk}$(b) is a universal set, Ω only when $$HOISTABLE_{in}(B) = \emptyset \text{ and } \bigcup_{p \in Pred(b)} HOISTABLE_{in}(p) \neq \phi.$$

GROUP-ON$_{out}$(b) is determined by the formula

GROUP-ON$_{out}$(b)=GROUP-ON$_{loc}$(b)∪(GROUP-ON$_{in}$(b)−GROUP-ON$_{blk}$(b)).

If the components in GROUP-ON$_{out}$(b) of each block b are invariable (step 803), GROUP-ON$_{out}$(b) of every 'block b is' regarded as stable, with the component in GROUP-ON$_{out}$(b) representing the group number to which block b belongs.

Figure 9A:
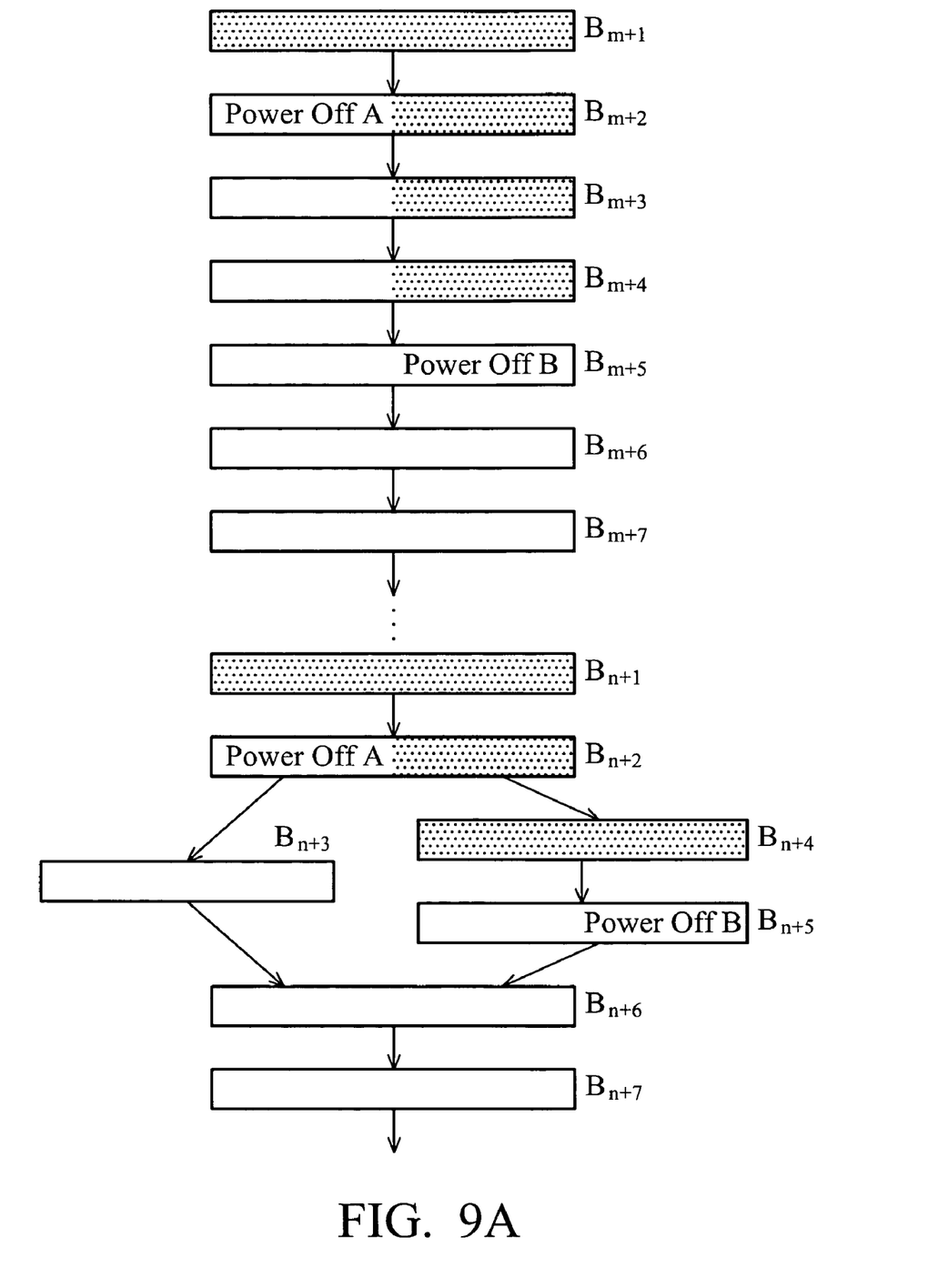
FIG. 9A is a control-flow graph of a program, utilization of power-gated components, and a first power-gating instruction placement.

In an exemplary embodiment of the invention, there are two power-gated components in a processor. FIG. 9A shows a control-flow graph of a program, utilization of the power-gated components, and a first power-gating instruction placement. The left side of each block represents utilization of component A, and the right side of each component represents utilization of component B. The dotted region indicates that the component is active in the block. As shown in FIG. 9A, the power-off instruction of component A is arranged in blocks B$_{m+2}$ and B$_{n+2}$ and the power-off instruction of component B is arranged in blocks B$_{m+5}$ and B$_{n+5}$ according to the first power-gating instruction placement. Based on the invention, MAX-SINK-SLK$_A$ is 4 and MAX-SINK-SLK$_B$ is 2. The component in SINKABLE$_{loc}$(B$_{m+2}$) is A$^4$, which indicates that there is a power-off instruction of component A occurs in block B$_{m+2}$ according to the first power-gating instruction placement. The superscript of A$^4$ indicates SINK-SLK$_A^{B_{m+5}}$ which is initialized as MAX-SINK-SLK$_A$. After carrying out the steps of sinkable analysis module described in FIG. 5, SINKABLE$_{loc}$(b), SINKABLE$_{blk}$(b), SINKABLE$_{in}$(b), and SINKABLE$_{out}$(b) of each block b are shown in Table 1. An empty set is indicated as a blank. And the components of SINKABLE$_{out}$(b) represents the executable power-off instructions in block b.

TABLE 1

| block b | SINKABLE$_{loc}$(b) | SINKABLE$_{blk}$(b) | SINKABLE$_{in}$(b) | SINKABLE$_{out}$(b) |
|---|---|---|---|---|
| B$_{m+1}$ | | | | |
| B$_{m+2}$ | {A$^4$} | | | {A$^4$} |
| B$_{m+3}$ | | | {A$^3$} | {A$^3$} |
| B$_{m+4}$ | | | {A$^2$} | {A$^2$} |
| B$_{m+5}$ | {B$^2$} | | {A$^1$} | {A$^1$, B$^2$} |
| B$_{m+6}$ | | {A} | {A$^0$, B$^1$} | {B$^1$} |
| B$_{m+7}$ | | {B} | {B$^0$} | |
| ... | | | | |
| B$_{n+1}$ | | | | |
| B$_{n+2}$ | {A$^4$} | | | {A$^4$} |
| B$_{n+3}$ | | | {A$^3$} | {A$^3$} |
| B$_{n+4}$ | | | {A$^3$} | {A$^3$} |
| B$_{n+5}$ | {B$^2$} | | {A$^2$} | {A$^2$, B$^2$} |
| B$_{n+6}$ | | | {A$^1$, B$^1$} | {A$^1$, B$^1$} |
| B$_{n+7}$ | | {A, B} | {A$^0$, B$^0$} | |

Power-off instruction classification module described in FIG. 7 is carried out. The resultant GROUP-ON$_{loc}$(b), GROUP-ON$_{in}$(b), GROUP-ON$_{blk}$(b), and GROUP-ON$_{out}$(b) of each block b are shown in Table 2. The components in GROUP-ON$_{out}$(b) is the group number of block b.

TABLE 2

| block b | GROUP-OFF$_{loc}$(b) | GROUP-OFF$_{blk}$(b) | GROUP-OFF$_{in}$(b) | GROUP-OFF$_{out}$(b) |
|---|---|---|---|---|
| B$_{m+1}$ | | | | |
| B$_{m+2}$ | {1} | | | {1} |
| B$_{m+3}$ | | | {1} | {1} |
| B$_{m+4}$ | | | {1} | {1} |
| B$_{m+5}$ | | | {1} | {1} |
| B$_{m+6}$ | | | {1} | {1} |
| B$_{m+7}$ | | Ω | {1} | |
| ... | | | | |
| B$_{n+1}$ | | | | |
| B$_{n+2}$ | {2} | | | {2} |
| B$_{n+3}$ | | | {2} | {2} |
| B$_{n+4}$ | | | {2} | {2} |
| B$_{n+5}$ | | | {2} | {2} |
| B$_{n+6}$ | | | {2} | {2} |
| B$_{n+7}$ | | Ω | {2} | |

Figure 9B:
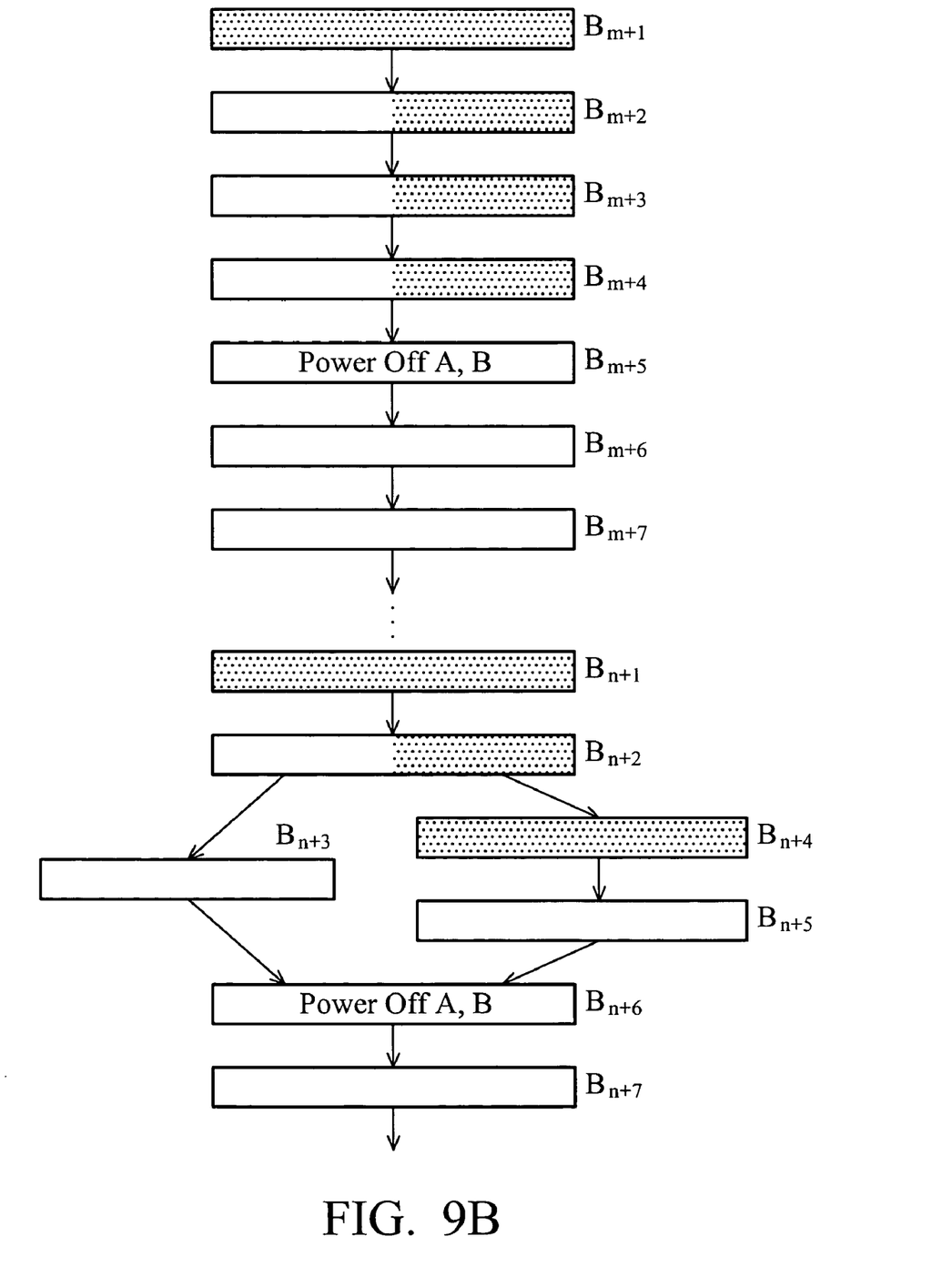
FIG. 9B shows a second power-gating instruction placement generated from FIG.

The blocks are divided into two groups (group 1 and group 2). On the basis of the executable power-off instructions of each block, all combinations of power-off instructions in each group are generated. To determine the best combination of each groups for power reduction, the second power-gating instruction placement is generated, shown in FIG. 9B. In group 1, the best combination of power-off instructions is a compound power-off instruction of components A and B, which is placed in block B$_{m+5}$. In group 2, the best combination of power-off instructions is a compound power-off instruction of components A and B, which is placed in block B$_{n+6}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of power-gating instruction scheduling for power leakage reduction, comprising:

receiving a program;
generating a control-flow graph by dividing the program into a plurality of blocks and linking the blocks according to the program, wherein the control-flow graph contains control commands;
analyzing utilization of power-gated components of a processor executing the program;
generating first power-gating instruction placement based on the control-flow graph and the utilization of the power-gated components, the first power-gating instruction placement comprising a plurality of power-off instructions and a plurality of power-on instructions to shut down inactive components;
generating second power-gating instruction placement by modifying the first power-gating instruction placement, wherein the second power-gating instruction placement comprises compound power-off instructions and compound power-on instructions generated by combining the combinable power-off instructions and combining the combinable power-on instructions respectively;
inserting power-gating instructions into the program according to the second power-gating instruction placement; and
executing the program by the processor.

2. The method as claimed in claim 1, generation of the second power-gating instruction placement further comprising:
determining whether the power-off instructions of the first power-gating instruction placement can be postponed to other blocks, and determining executable blocks of each power-off instruction;
determining whether the power-on instructions of the first power-gating instruction placement can be advanced to other blocks, and determining executable blocks of each power-on instruction;
dividing the executable blocks of the combinable power-off instructions as one group and the executable blocks of the combinable power-on instructions as one group;
evaluating all combinations of the power-off instructions in each group according to the executable blocks of the power-off instructions in each group;
evaluating all combinations of the power-on instructions in each group according the executable blocks of the power-on instructions in each group; and
determining the best combination in each group for power reduction, wherein the second power-gating instruction placement is generated based on the best combination in each group.

3. The method as claimed in claim 2, determination of executable blocks of each power-off instruction in the first power-gating instruction placement further comprising determining executable power-off instructions for each block by data-flow analysis; and determination of executable blocks of each power-on instruction in the first power-gating instruction placement further comprising determining executable power-on instructions for each block by data-flow analysis.

4. The method as claimed in claim 3, division of the blocks in the control-flow graph into groups further comprising:
classing the executable blocks of the combinable power-off instructions of the first power-gating instruction placement as one group by data-flow analysis based on the executable power-off instructions of every block; and
classing the executable blocks of the combinable power-on instructions of the first power-gating instruction placement as one group by data-flow analysis based on the executable power-on instructions of every block.

5. The method as claimed in claim 3, determination of the executable power-off instructions of each block further comprising:
evaluating $MAX\_SINK\_SLK_C$ for each component C to represent the maximum amount of blocks to which the power-off instruction of component C can be postponed;
determining $SINKABLE_{loc}(b)$ for each block b according to the first power-gating instruction placement, wherein $SINKABLE_{loc}(b)$ is a set of power-off instructions occurring within block b, and each power-off instruction in $SINKABLE_{loc}(b)$ is associated with an integer number $SINK\_SLK_C^b$ which indicates how many blocks to which the power-off instruction of component C can be postponed, wherein $SINK\_SLK_C^b$ is initialized as $MAX\_SINK\_SLK_C$;
determining $SINKABLE_{in}(b)$, $SINKABLE_{blk}(b)$, and $SINKABLE_{out}(b)$ of every block b from the beginning block to the end and repeatedly until $SINKABLE_{out}(b)$ of every block b is stable, wherein the power-off instructions in the stable $SINKABLE_{out}(b)$ represent the executable power-off instructions in block b,
wherein $SINKABLE_{in}(b)$, $SINKABLE_{blk}(b)$, and $SINKABLE_{out}(b)$ of one block b are calculated by:
determining $SINKABLE_{in}(b)$ by the formula $$SINKABLE_{in}(b) = \bigcap_{p \in Pred(b)} SINKABLE_{out}(p),$$

where Pred(b) represents former blocks of block b;
calculating $SINK\_SLK_C^b$ for component C, the power-off instruction of which exists in $SINKABLE_{in}(b)$ and not in $SINKABLE_{loc}(b)$, by the formula $$SINK\_SLK_C^b = MIN_{p \in Pred(b)}(SINK\_SLK_C^p) - 1;$$

determining $SINKABLE_{blk}(b)$, a set of power-off instructions having zero $SINK\_SLK_C^b$; and
determining $SINKABLE_{out}(b)$ by the following equation:

$$SINKABLE_{out}(b) = SINKABLE_{loc}(b) \cup (SINKABLE_{in}(b) - SINKABLE_{blk}(b)).$$

6. The method as claimed in claim 3, determination of the executable power-on instructions of each block further comprising:
evaluating $MAX\_HOIST\_SLK_C$ for each component C to represent the maximum amount of blocks to which the power-on instruction of component C can be advanced;
determining $HOISTABLE_{loc}(b)$ for each block b according to the first power-gating instruction placement, wherein $HOISTABLE_{loc}(b)$ is a set of power-on instructions occurring within block b, with each power-on instruction in $HOISTABLE_{loc}(b)$ associated with an integer number $HOIST\_SLK_C^b$ which indicates how many blocks to which the power-on instruction of component C can be advanced, wherein $HOIST\_SLK_C^b$ is initialized as $MAX\_HOIST\_SLK_C$;
determining $HOISTABLE_{out}(b)$; $HOISTABLE_{blk}(b)$, and $HOISTABLE_{in}(b)$ of every block b from the beginning block to the end and repeatedly until $HOISTABLE_{in}(b)$ of every block b is stable, wherein the power-on instructions in the stable $HOISTABLE_{in}(b)$ represent the executable power-on instructions in block b, wherein HOISTABLE$_{out}$(b), HOISTABLE$_{blk}$(b), and HOISTABLE$_{in}$(b) of one block b are calculated by:
determining HOISTABLE$_{out}$(b) by the formula $$HOISTABLE_{out}(b) = \bigcap_{s \in Succ(b)} HOISTABLE_{in}(s),$$

where Succ(b) represents subsequent blocks of block b;

calculating HOIST_SLK$_C^b$ for component C, the power-on instruction of which exists in HOISTABLE$_{out}$(b) and not in HOISTABLE$_{loc}$(b), by the formula:

HOIST_SLK$_C^b$=MIN$_{S \in Succ(b)}$(HOIST_SLK$_C^S$)-1;

determining HOISTABLE$_{blk}$(b), a set of power-on instructions having zero HOIST_SLK$_C^b$; and
determining HOISTABLE$_{in}$(b) by the formula:

HOISTABLE$_{in}$(b)=HOISTABLE$_{loc}$(b)∪(HOISTABLE$_{out}$(b)−HOISTABLE$_{blk}$(b)).

7. The method as claimed in claim 4, classification of the executable blocks of the combinable power-off instructions of the first power-gating instruction placement as one group further comprising:
determining GROUP-OFF$_{loc}$(b) for each block b, wherein, if $$SINKABLE_{out}(b) \neq \emptyset \text{ and } \bigcup_{p \in Pred(b)} SINKABLE_{out}(p) = \emptyset,$$

the element of GROUP-OFF$_{loc}$(b) is an integer value that never appears in other groups and is generated by a counter, otherwise, GROUP-OFF$_{loc}$(b) is an empty set;
determining GROUP-OFF$_{in}$(b), GROUP-OFF$_{blk}$(b), and GROUP-OFF$_{out}$(b) of every block b from the beginning block to the end and repeatedly until GROUP-OFF$_{out}$(b) of every block b is stable, wherein the element of GROUP-OFF$_{out}$(b) represents the group to which block b belongs,
wherein GROUP-OFF$_{in}$(b), GROUP-OFF$_{blk}$(b), and GROUP-OFF$_{out}$ (b) of one block b are calculated by:
determining GROUP-OFF$_{in}$(b) by the formula $$GROUP\text{-}OFF_{in}(b) = \begin{cases} \phi, & \text{if } MIN_{p \in Pred(b)}(\Phi(GROUP\text{-}OFF_{out}(p))) = \infty \\ MIN_{p \in Pred(b)}(\Phi(GROUP\text{-}OFF_{out}(p))), & \text{otherwise} \end{cases},$$

where Φ returns infinity if GROUP-OFF$_{out}$(p) is an empty set, otherwise, Φ returns the value of GROUP-OFF$_{out}$(p);
determining GROUP-OFF$_{blk}$(b), either a universal set named Ω or an empty set, wherein GROUP-OFF$_{blk}$(b) is Ω only when SINKABLE$_{out}$(b)=ø and $\bigcup_{p \in Pred(b)}$SINKABLE$_{out}$(p)≠φ; and
determining GROUP-OFF$_{out}$(b) by the formula:

GROUP-OFF$_{out}$(b)=GROUP-OFF$_{loc}$(b)∪(GROUP-OFF$_{in}$(b)−GROUP-OFF$_{blk}$(b)).

8. The method as claimed in claim 4, classification of the executable blocks of the combinable power-on instructions of the first power-gating instruction placement as one group further comprising:
determining GROUP-ON$_{loc}$(b) for each block b, wherein, if $$HOISTABLE_{in}(b) \neq \emptyset \text{ and } \bigcup_{p \in Pred(b)} HOISTABLE_{in}(p) = \emptyset,$$

the element of GROUP-ON$_{loc}$(b) is an integer value, not appearing in other groups, generated by a counter, otherwise, GROUP-OFF$_{loc}$(b) is an empty set;
determining GROUP-ON$_{in}$(b), GROUP-ON$_{blk}$(b), and GROUP-ON$_{out}$(b) of every block b from the beginning block to the end and repeatedly until GROUP-ON$_{out}$(b) of every block b is stable, wherein the element of GROUP-ON$_{out}$(b) represents the group to which block b belongs,
wherein GROUP-ON$_{in}$(b); GROUP-ON$_{blk}$(b), and GROUP-ON$_{out}$(b) of one block b are calculated by:
determining GROUP-ON$_{in}$(b) by the formula $$GROUP\text{-}ON_{in}(b) = \begin{cases} \phi, & \text{if } MIN_{p \in Pred(b)}(\Phi(GROUP\text{-}ON_{out}(p))) = \infty \\ MIN_{p \in Pred(b)}(\Phi(GROUP\text{-}ON_{out}(p))), & \text{otherwise} \end{cases},$$

where Φ returns infinity if GROUP-ON$_{out}$(p) is an empty set, otherwise, Φ returns the value of GROUP-ON$_{out}$(p);
determining GROUP-ON$_{blk}$(b), either a universal set named Ω or an empty set, wherein GROUP-ON$_{blk}$(b) is Ω only when $$HOISTABLE_{in}(b) = \emptyset \text{ and } \bigcup_{p \in Pred(b)} HOISTABLE_{in}(p) \neq \phi;$$

and
determining GROUP-ON$_{out}$(b) by the formula

GROUP-ON$_{out}$(b)=GROUP-ON$_{loc}$(b)∪(GROUP-ON$_{in}$(b)−GROUP-ON$_{blk}$(b)).

9. A system of power-gating instruction scheduling for power leakage reduction, receiving a program, generating a power-gated program comprising power-gating instructions, and executing the power-gated program by a processor, the system comprising:
a control-flow graph construction module, generating a control-flow graph by dividing the program into a plurality of blocks and linking the blocks according to the program, wherein the control-flow graph contains control commands;
a utilization analysis module, analyzing utilization of power-gated components of the processor executing the program;
a first power-gating instruction placement generator, generating first power-gating instruction placement based on the control-flow graph and the utilization of the power-gated components, the first power-gating instruction placement comprising a plurality of power-off instructions and a plurality of power-on instructions to shut down inactive power-gated components;
a second power-gating instruction placement generator, generating second power-gating instruction placement by modifying the first power-gating instruction placement, wherein the second power-gating instruction placement comprises compound power-off instructions and compound power-on instructions generated by combining the combinable power-off instructions and combining the combinable power-on instructions respectively; and
a power-gating instruction insertion module, inserting the power-gating instructions into the program according to the second power-gating instruction placement to generate the power-gated program.

10. The system as claimed in claim 9, wherein the second power-gating instruction placement further comprises:
a power-gating instruction analysis module, determining whether the power-off instructions of the first power-gating instruction placement can be postponed to other blocks to determine executable blocks of each power-off instruction; and determining whether the power-on instructions of the first power-gating instruction placement can be advanced to other blocks to determine executable blocks of each power-on instruction;
a classification module, dividing the blocks in the control-flow graph into groups to class the executable blocks of the combinable power-off instructions as one group and to class the executable blocks of the combinable power-on instructions as one group; and
a power evaluation module, evaluating all combinations of the power-off instructions in each group according to the executable blocks of the power-off instructions in each group; and evaluating all combinations of the power-on instructions in each group according to the executable blocks of the power-on instructions in each group, the power evaluation module further determining the best combination in each group for power reduction, wherein the second power-gating instruction placement is generated based on the best combination in each group.

11. The system as claimed in claim 10, the power-gating instruction analysis module further comprising a sinkable analysis module and a hoistable analysis module, the sinkable analysis module determining a set of executable power-off instructions for each block by data-flow analysis, the hoistable analysis module determining a set of executable power-on instructions for each block by data-flow analysis.

12. The system as claimed in claim 11, wherein the classification module further comprises:
a power-off instruction classification module, classing the executable blocks of the combinable power-off instructions of the first power-gating instruction placement into one group by data-flow analysis based on the executable power-off instructions of every block; and
a power-on instruction classification module, classing the executable blocks of the combinable power-on instructions of the first power-gating instruction placement into one group by data-flow analysis based on the executable power-on instructions of every block.

* * * * *